Aug. 15, 1950   J. W. MacCLATCHIE   2,519,144
COMBINATION PISTON AND ROD
Filed Oct. 2, 1948

INVENTOR,
JOHN W. MacCLATCHIE
BY
Robert M. McManigal
ATTORNEY

Patented Aug. 15, 1950

2,519,144

UNITED STATES PATENT OFFICE 2,519,144

COMBINATION PISTON AND ROD

John W. MacClatchie, Los Angeles, Calif.

Application October 2, 1948, Serial No. 52,558

1 Claim. (Cl. 309—17)

This invention relates to combination pistons and rods used in mud pumps and the like.

In conventional pistons for use in mud pumps a piston having a bore through it is mounted on a piston rod, and secured on the rod by means of nuts. In this type of construction it is difficult if not impossible to prevent leakage of fluid between the piston and the rod from one side of the piston to the other. Another disadvantage of this type of construction is that it is sometimes difficult to remove the piston from the rod, particularly in those instances in which pistons having tapered bores are secured on tapered piston rods.

An object of my invention is to provide a piston which does not have a bore extending through it.

Another object of my invention is to provide a novel type of piston.

Another object of my invention is to provide a novel type of piston rod.

Another object of my invention is to provide a novel means of assembling the piston and the piston rod.

Another object of my invention is to provide a combination piston and piston rod which is quick and easy to assemble and disassemble.

My invention has many other objects, advantages, and features, some of which, with the foregoing, will be set forth at length in the following description where I shall outline one form of my invention, which I have selected for illustration in the drawings accompanying and forming a part of the present specification.

Figure 1:
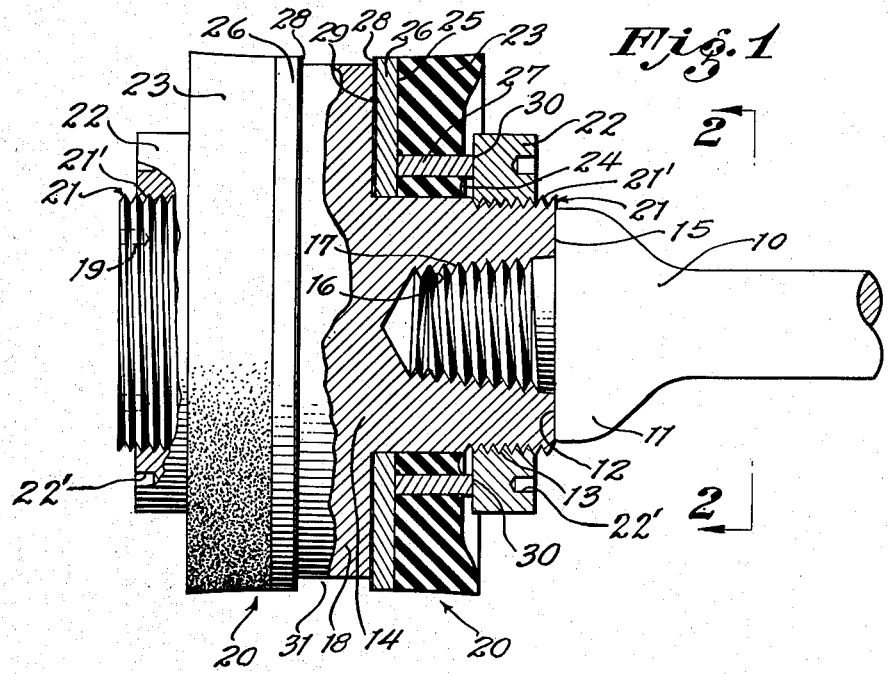
Fig. 1 is a side elevational view of a combination piston and rod embodying the invention, partly in section.
Figure 2:
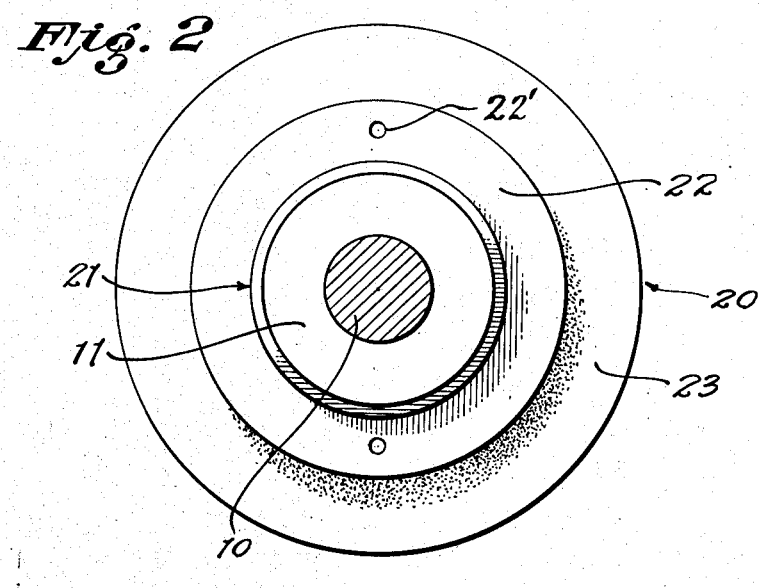
Fig. 2 is a view taken along the line 2—2 of Fig. 1.

Referring to the drawings, the numeral 10 designates a piston rod having an enlarged end 11, terminating in an annular shoulder 12 and tapered male threads 13.

The piston body 14 is provided with an annular shoulder 15, a tapered recessed portion 16, which is provided with tapered female threads 17, an annular radially projecting abutment 17, which forms a backing for packing elements, and holes 19 for suitable wrenches in order to assemble and disassemble the combination piston and rod.

The piston is provided with suitable packing elements on each side of the radial flange 18. The construction of the particular packing elements used forms no part of the present invention. However, I prefer to use a construction in which the packing elements are adapted to be sealed off with respect to the radial flange 18 without distorting the resilient portions of the packing elements. An instance of this construction is described and claimed in the specification of my application Serial Number 52,557, filed October 2, 1948.

In using the packing elements 20 of the type shown in said specification, the outer peripheries 21 of the piston body 14 are threaded as indicated at 21' and provided with retaining nuts 22 having holes 22' for suitable wrenches. The packing elements 20 are formed in part of rubber or other suitable resilient material 23. The outer ends of the packing elements 20 may be provided with annular grooves 24, the sides of which grooves adjacent to the piston body 14 are adapted to be expanded by fluid pressure to seal off the packing elements 20 with respect to said piston body 14.

Means are provided to seal off the packing elements 20 with respect to the radial flange 18 without distorting the resilient portions 23 of the packing elements. As an instance of this arrangement, the inner end 25 of each packing element 20 is reinforced with a metallic plate 26 and the packing elements 20 are provided with longitudinally projecting annular members 27 which are welded or otherwise secured to the metallic plates 26. Resilient material, fabric, or other suitable material 28 is also provided on the inner ends 29 of said metallic plates 26, which material may be vulcanized or otherwise secured to the metallic plates 26 at the same time that the resilient material 23 is vulcanized to said plates and to said annular members 27. The packing elements 20 may be sealed off with respect to the flange 18 without distorting the resilient portions 23 of said packing elements, by means of the retaining nuts 22 which are adapted to engage the outer ends 30 of the annular members 27 and tighten said members with respect to the flange 18.

An annular space 31 may be provided between the packing elements 20 and beyond the periphery of the radial flange 18, so that an annular space will be provided for fluid which gets between the outer periphery of the packing elements 20 and the cylinder wall (not shown).

By means of my invention, it is impossible for fluid to pass from one side of the piston to the other side except beyond the periphery of the flange 18. The piston and piston rod may be easily and quickly assembled and disassembled, and when assembled, the annular shoulder 12 of the piston rod is adapted to be rigidly held in close contact with the annular shoulder 15 of the piston body.

From the foregoing description taken in connection with the accompanying drawings, the uses, advantages, and operation of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claim.

I claim:

The combination with a piston rod having a tapered threaded end and an enlarged shoulder, of a piston having an inwardly tapered and threaded recess extending longitudinally into the piston and being closed at its inner end and having an annular shoulder surrounding the outer end of said recess, said tapered threaded recess being adapted to be threaded on said tapered threaded end of said piston rod, and said annular shoulder of said piston adapted to be held in close contact with the enlarged shoulder of said piston rod when said tapered threaded portions are threaded together.

JOHN W. MacCLATCHIE.

REFERENCES CITED

The following references are of record in the file of this patent:

UNITED STATES PATENTS

| Number | Name | Date |
|---|---|---|
| 1,239,869 | Block | Sept. 11, 1917 |
| 2,246,942 | Janney et al. | June 24, 1941 |
| 2,285,863 | Jeffrey et al. | June 9, 1942 |